Patented May 19, 1942

2,283,421

UNITED STATES PATENT OFFICE 2,283,421

METHOD AND COMPOSITION FOR DEGREASING SKINS

Fritz-Carl Castendyk, Mattapan, Mass.

No Drawing. Application January 20, 1939,
Serial No. 252,041

10 Claims. (Cl. 149—2)

My invention relates to the removal of natural fats and grease from skins, animal fibers, and other animal raw materials, as in the processing of skins or the scouring of wool, being especially adapted for the so-called "degreasing" of sheepskins. The invention, which comprises both the process and novel compositions of matter particularly useful for such skin and fiber treatment, aims to provide substantial savings in the time and cost of treatment and to secure an improved product.

By way of example the process will be described with reference to the treatment of sheepskins. These are received in the condition known to the trade as "pickled skins." As a preliminary step I remove any remaining flesh from the skins, and preferably dry them to some extent say by removing up to about 30% of their usual moisture content. This drying may be effected by hanging and airing the skins, or by use of a centrifuge, or in any other convenient manner. Partially drying the skins it has been found appreciably facilitates the subsequent treatment of the skins according to the invention.

In the subsequent treatment of the fleshed, partially dried skins they are conveniently handled in "packs" or batches of approximately 1,000 pounds, such packs each comprising from 300 to 500 or more skins depending upon their size. The values given in the following description are those appropriate for such packs.

A separated pack of the sheepskins, fleshed and dried as indicated, is, according to this example of the invention, placed in a so-called mill or tumbling drum in which the internal temperature is desirably from about 85 to 95° F., that is to say, substantially ordinary summer temperature. When colder temperature conditions prevail the drum containing the batch of skins may be preliminarily heated as by the introduction of steam before entering into the drum the treating liquor now to be described.

For treating the pack of skins a degreasing bath is supplied the drum. This bath conveniently may be prepared in any suitable mixing chamber convenient to the drum as, for example, a chamber at a higher level than the drum, to which latter the bath may be supplied from the chamber through the usual hollow drum axle.

A major ingredient of the bath, in quantity, is a suitable substance which will loosen the grease, preferably a hydrocarbon of relatively low volatility. Preferably this substance is kerosene, 21 to 32 gallons preferably being employed, 25 gallons ordinarily securing satisfactory results. In place of kerosene other petroleum distillates such as gasolene may be employed, and, in general, any liquid hydrocarbon that will loosen grease, such as methyl alcohol, benzol, xylol, toluol, etc.

Further, in accordance with my invention a novel composition for facilitating and expediting the degreasing operation is prepared and mixed with the kerosene or other degreasing substance. This composition comprises as its main ingredients preferably (1) a water soluble sulphonated condensation reaction product of the naturally occurring fatty acids in nut kernel oils with one of the mono-amines, (2) a carrier for this condensation product, and (3) an alkali that will prevent too great an acidity of the liquor during the treating operation.

Preferably the sulphonated condensation product is prepared by subjecting to sulphuric acid a condensation product made by condensing a mixture of mono-ethanol-amine and the fatty acids having 12 to 14 carbon molecules ($C_{12}$ to $C_{14}$ acids) naturally occurring in cocoanut-oil or other nut oils such as palm nut oil, or mixtures of these oils. This product may be made, for example, by taking 210 pounds of cocoanut fatty acids, containing a material quantity of the $C_{12}$ to $C_{14}$ acids and having an average molecular weight of 210, and heating it with 67 pounds of mono-ethanol-amine for a few hours in a still until the acid number determined in alcohol sinks to below 5, the water evolved being allowed to escape. This mass when allowed to cool sets to a wax-like substance. 100 pounds of the substance so prepared may be added to 100 pounds of sulphuric acid monohydrate at from 30 to 35° C. while stirring and cooling. After the mass becomes homogeneous tests may be made to determine the water solubility of the resulting sulphonated fatty ester, and as soon as the solubility is found to be complete the mass may be mixed with ice and neutralized while cooling with sufficient 50% caustic soda to bring the whole to a neutral reaction to litmus. Other mono-amines, such as mono-propanol-amine and mono-butyl-amine, may be employed, and preferably in all these cases the reactions are made with the substances in the proportion of a single molecule of fatty acid to single molecules of amine and sulphuric acid.

The carrier for the sulphonated fatty ester condensation product above described is preferably sulphonated castor-oil. The alkali is preferably ammonia, that is to say, a water solution of ammonia gas. A mixture consisting of the sulphonated fatty ester 1.5 to 2.5 parts, sulphonated castor-oil 5 to 6.5 parts, and ammonia 4 to 5 parts at 26 degrees Baumé concentration, or equivalent amount of ammonia at other concentration, may be made with sufficient water to make a paste or liquid of convenient consistency for handling. Preferably the minimum amounts mentioned in these ranges are employed. The paste or liquid conveniently is stored in closed containers to prevent evaporation of the ammonia gas, and the paste may be diluted with water to make it liquid when it is to be incorporated into the bath. The liquid may be stirred into the kerosene or other liquid hydrocarbon preferably in the chamber above referred to. Preferably the amount so added to the hydrocarbon for a 1,000 pound pack of skins is such as to employ the number of pounds of each substance as just expressed in parts thereof. Preferably the total amount of water in the liquid or bath should be kept at a minimum, and under ordinary conditions should not exceed such amount as will incorporate into the bath about 1 gallon for a 1,000 pound batch of skins.

Other sulphonated water soluble oils, such as sulphonated neat's-foot oil, sulphonated cod-liver oil, sulphonated cotton-seed oil, and, in general, any water soluble oil which will act as a carrier for the sulphonated fatty ester and cause it to penetrate the skins, may be employed in place of the sulphonated castor-oil, the latter however it has been found acting particularly satisfactorily as a skin penetrating carrier for the sulphonated fatty ester. Similarly, other water soluble alkalis that will liberate ammonia gas, such as ammonium carbonate, may be employed in place of the ammonia. The amount of alkali employed is such as to prevent too great an acidity of the liquor during the treating operation, which latter it has been found works particularly satisfactorily at an acidity corresponding to a pH value of 2 to 2.5. Ordinarily the amount of ammonia above mentioned will be sufficient for a 1,000 pound pack of ordinary pickled skins. For skins of higher or lower acidity more or less ammonia may be added to the bath to control the acidity.

In making the above described composition the sulphonated fatty ester preferably is added in powdered form to the sulphonated castor-oil or other carrier to dissolve it therein. The ammonia and preferably such small quantity of water as may be necessary to form a homogeneous paste may then be added. This paste, as above explained, may afterward be diluted with water to prepare it for adding to the kerosene or other grease loosener employed. Preferably when the composition is to be made in liquid form the ammonia an adequate water are added to the sulphonated castor-oil or other carrier to form a solution, and to that solution is added the sulphonated fatty ester in powdered or paste form to dissolve it therein.

The temperature at which the skins are treated is of considerable importance and should be carried out at from about 85 to 95° F. as above mentioned. As explained above, the contents of the drum after the skins are placed in it are preferably heated to this temperature, and, if necessary, the treating solution is also heated to a like temperature prior to entering it into the drum.

The treating liquor at the above mentioned temperature is entered into the drum containing the load of skins preferably as the drum is being rotated, and rotation of the latter is continued so as to agitate its contents for a period of about 1.5 to 2.5 hours, at the end of which time or thereabout the natural grease in the skins will have been liberated, and the liquor in the drum may be drained off. Thereupon the skins in the drum may be washed to free them of the liberated grease and treating liquor by entering into the rotating drum a weak brine solution and allowing it to act on the skins for about 18 to 30 minutes, two or three such washings being adequate. For a 1,000 pound batch of skins a suitable washing liquid, which liquid is preferably lukewarm in winter and at room temperature or somewhat less in summer, may comprise for each washing about 250 gallons of brine solution at about 2 to 6 degrees Baumé concentration.

Skins, or other animal product such as wool, so treated are in readiness for further processing and finishing, such as tanning in the case of skins, or carding and the like in the case of wool.

The above described process avoids entirely the necessity of pressing the material under treatment, such as subjecting it to heavy hydraulic pressure for the purpose of squeezing out part of the grease. Such pressing of the batch of sheepskins leaves them caked together in a rigid mass, requiring the further step of "pulling back" or separating them. With the improved process the skins retain their natural uncompressed and pliable condition, whereas when pressure is employed it generally modifies the skins in an objectionable manner, with frequent resulting injury in pulling them back out of the matted cake.

As compared with other degreasing methods which do not resort to pressure but employ commercially known degreasing fluids my process effects a material saving in costs of materials, and may be performed in about one-third the time.

It will be understood that, within the scope of the appended claims, wide deviations may be made from the form of the invention herein described without departing from the spirit of the invention.

I claim:

1. The method of degreasing pickled animal skins which comprises drying the skins to remove excess moisture, and afterward agitating them with liquid hydrocarbon grease solvent mixed with volatile alkali, water solution of sulphonated oil, and sulphonated product of the condensation reaction of fatty acids containing a substantial quantity of the $C_{12}$ and $C_{14}$ acids with a monoamine, the amount of alkali being sufficient to cause the mixture to have a pH value of from above 2 to 2.5 when reacting with the skins.

2. The method according to claim 1 in which the mono-amine is mono-ethanol-amine.

3. The method according to claim 1 in which the mono-amine is mono-ethanol-amine, and the fatty acid is the natural occurring fatty acid of cocoanut-oil.

4. The method according to claim 1 in which the alkali is ammonia, the hydrocarbon is kerosene, and the oil is castor-oil.

5. The method according to claim 1 in which the alkali is ammonia, the hydrocarbon is kerosene, and the oil is castor-oil, the ingredients being in the following proportions with reference to approximately 1,000 pounds of skins: kerosene, 21 to 32 gallons; ammonia, the equivalent of 4 to 5 pounds at 26 degrees Baumé concentration; sulphonated castor-oil, 5 to 6.5 pounds;

and sulphonated condensation product, 1.5 to 2.5 pounds.

6. The method according to claim 1 in which the alkali is ammonia, the hydrocarbon is kerosene, the oil is castor-oil, the mono-amine is mono-ethanol-amine, and the fatty acid is the natural occurring fatty acid of cocoanut-oil, the ingredients being in the following proportions with reference to approximately 1,000 pounds of skins: kerosene, 21 to 32 gallons; ammonia, the equivalent of 4 to 5 pounds at 26 degrees Baumé concentration; sulphonated castor-oil, 5 to 6.5 pounds; and sulphonated condensation product, 1.5 to 2.5 pounds.

7. A composition of matter containing ammonia, water soluble sulphonated castor-oil, and water soluble sulphonated product of the condensation reaction of fatty acids containing a substantial quantity of the $C_{12}$ and $C_{14}$ acids with a mono-amine, in the following proportions: ammonia, 4 to 5 pounds at 26 degrees Baumé concentration; sulphonated castor-oil, 5 to 6.5 pounds; and said condensation reaction product, 1.5 to 2.5 pounds.

8. The composition according to claim 7 in which the mono-amine is mono-ethanol-amine.

9. The composition according to claim 7 in which the fatty acid is the natural occurring fatty acid of cocoanut-oil, and the mono-amine is mono-ethanol-amine.

10. A composition of matter containing ammonia, water soluble sulphonated castor-oil, water soluble sulphonated product of the condensation reaction of the naturally occurring fatty acids of cocoanut-oil with a mono-amine, and kerosene, in the following proportions: ammonia, 4 to 5 pounds at 26 degrees Baumé concentration; sulphonated castor-oil, 5 to 6.5 pounds; said condensation reaction product, 1.5 to 2.5 pounds; and kerosene, 21 to 25 gallons.

FRITZ-CARL CASTENDYK.

CERTIFICATE OF CORRECTION.

Patent No. 2,283,421. May 19, 1942.

FRITZ-CARL CASTENDYK.

It is hereby certified that error appears in the above numbered patent requiring correction as follows: In the grant, line 6, title of invention, for "COMPOSTIONS" read --COMPOSITIONS--; page 2, second column, line 58, claim 1, for the word "above" read --about--; line 69-70, claim 5, for "keresene" read --kerosene--; page 3, second column, line 14, claim 10, for "acids" read --acid--; and that the said Letters Patent should be read with this correction therein that the same may conform to the record of the case in the Patent Office.

Signed and sealed this 30th day of June, A. D. 1942.

(Seal)

Henry Van Arsdale,
Acting Commissioner of Patents.